US010399193B2

(12) United States Patent
Gray (10) Patent No.: US 10,399,193 B2
(45) Date of Patent: Sep. 3, 2019

(54) METHODS AND APPARATUS TO ALIGN THREADED FASTENERS

(71) Applicant: The Boeing Company, Chicago, IL (US)

(72) Inventor: Everette Desmond Gray, Seattle, WA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 15/415,521

(22) Filed: Jan. 25, 2017

(65) Prior Publication Data

US 2018/0207759 A1    Jul. 26, 2018

(51) Int. Cl.
*B23P 19/10* (2006.01)
*B23P 19/06* (2006.01)
*B25B 21/00* (2006.01)
*B25B 23/14* (2006.01)
*G01B 17/00* (2006.01)

(52) U.S. Cl.
CPC ............ *B23P 19/105* (2013.01); *B23P 19/06* (2013.01); *B23P 19/066* (2013.01); *B23P 19/10* (2013.01); *B25B 21/00* (2013.01); *B25B 23/14* (2013.01); *G01B 17/00* (2013.01)

(58) Field of Classification Search
CPC ......... B23P 19/105; B23P 19/06; B23P 19/10; B23P 19/066; G01B 17/00; B25B 23/14; B25B 21/00
See application file for complete search history.

(56) References Cited

U.S. PATENT DOCUMENTS

2016/0061782 A1*   3/2016   Persson ................... B25B 23/14
                                                      73/597
2016/0082557 A1    3/2016   Friz et al.

FOREIGN PATENT DOCUMENTS

| DE | 102006048694 | 4/2008 |
| DE | 102011053150 | 2/2013 |
| JP | H10058248 | 3/1998 |
| JP | 2001235379 | 8/2001 |
| JP | 2008296291 | 11/2008 |
| JP | 4924823 B2 * | 4/2012 |

OTHER PUBLICATIONS

Machine Translation of Voigt, DE102006048694A1, Apr. 2008 (Year: 2008).*
Machine Translation of Uruno, JP4924823B2, Apr. 2012 (Year: 2012).*

(Continued)

*Primary Examiner* — Ryan J. Walters
(74) *Attorney, Agent, or Firm* — Hanley, Flight & Zimmerman, LLC (57) ABSTRACT

Example methods and apparatus to align threaded fasteners are disclosed herein. An example apparatus includes a socket to hold a fastener and a sensor disposed adjacent the socket. The sensor is to measure acoustic waves near the socket while the socket rotates the threaded fastener in a reverse-thread direction against an end of a threaded pin. The example apparatus also includes an electronic control unit to determine whether the fastener and the threaded pin are aligned based on the acoustic waves measured by the sensor.

16 Claims, 9 Drawing Sheets

(56) References Cited

OTHER PUBLICATIONS

European Patent Office, "Examination Report", in connection with European Application No. 17209759.4-1019 dated Jun. 5, 2018, 9 pages.
Tomchick et al., "An Automated Production Fastening System for LGP and Hi-Lok Titanium Bolts for the Boeing 737 Wing Panel Assembly Line," SAE Technical Paper 2015-01-2514, Sep. 15, 2015, 8 pages.

* cited by examiner

METHODS AND APPARATUS TO ALIGN THREADED FASTENERS

FIELD OF THE DISCLOSURE

This disclosure relates generally to threaded fasteners and, more particularly, to methods and apparatus to align threaded fasteners.

BACKGROUND

Threaded fasteners, such as nuts and bolts, are widely used to connect one or more parts or structures. For instance, a bolt may be inserted through an opening in the parts such that an end of the bolt extends outward from the opening. Then, a nut may be threaded onto the end of the bolt to hold the parts between the nut and a head of the bolt. To thread the nut and the bolt together, the threads on the nut mesh with the threads on the bolt.

SUMMARY

An example apparatus disclosed herein includes a socket to hold a fastener and a sensor that is disposed adjacent the socket. The sensor is to measure acoustic waves near the socket while the socket rotates the fastener in a reverse-thread direction against an end of a threaded pin. The example apparatus also includes an electronic control unit to determine whether the fastener and the threaded pin are aligned based on the acoustic waves measured by the sensor.

An example method disclosed herein includes rotating a fastener against an end of a threaded pin in a reverse-thread direction, detecting, with a sensor, a thread-fall acoustic signal generated by the fastener and the threaded pin, and stopping the rotation in the reverse-thread direction when the thread-fall acoustic signal is detected.

An example machine readable storage medium disclosed herein includes instructions that, when executed, cause a machine to at least rotate a fastener against an end of a threaded pin in a reverse-thread direction and determine when the fastener and the threaded pin are aligned based on a thread-fall acoustic signal detected by a sensor disposed near the fastener.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example methods, apparatus, and articles of manufacture that may be used to align threaded components or parts before threading the parts together. By ensuring the threads of the two parts are aligned before tightening, disclosed examples greatly reduce the likelihood of cross-threading. As such, examples disclosed herein ensure a proper threading between the parts and reduce failure that would otherwise be caused when the two parts are cross-threaded. Before turning to the details of the present disclosure, a brief explanation of how threaded parts work is provided below.

In general, a thread is formed by a ridge wrapped around a cylinder (e.g., a bolt body) or an inner surface of an opening (e.g., a nut) in the form of a helix. Each turn of the ridge is axially separated from the next turn by a width of one ridge, thereby forming a groove defined between consecutive turns. A mating occurs between a male part having external threads and a female part having internal threads. For example, a bolt has an external thread, and a nut has an internal thread formed in the opening of the nut. When threadably coupling the two parts, a ridge of the first part is rotated into a groove of the second part, and a ridge of the second part is rotated into a groove of the first part. More specifically, each thread has a start where the ridge begins. The start of the ridge and the subsequent turn of the ridge form a groove to receive the start of the ridge of the other part. When rotated in a forward-thread direction, the start of the ridge of the first part slides into the groove between the start of the ridge and the next turn of the ridge on the second part, and vice versa.

However, a male threaded part and a female threaded part can become cross-threaded if the parts are misaligned (e.g., non-coaxial). In particular, the parts are designed to be threaded together when they are axially aligned or substantially axially aligned (e.g., there is usually some play). If the parts are not aligned, the start of the ridge of one thread does not enter the first groove of the other part. Instead, it may catch in a second or third groove. Then, when rotating the parts, the misaligned turns of the thread grind against each other, which can often destroy or wear away the threads. In some instances, the threads may be completely destroyed and are useless even after unthreading the two parts.

Cross-threading can also pose a significant problem with frangible collar fasteners. Frangible collar fasteners include a threaded collar (a female part) and a wrenching element that are coupled by a breakable connection. The collar has a threaded opening and the wrenching element has an opening without threads to enable the threaded pin to extend through the wrenching element without connecting to the threaded pin. A tool, such as a wrench, may be used to hold the wrenching portion and rotate the wrenching portion (and, thus, the collar) to thread the collar onto a threaded pin. As the collar screws onto the threaded pin and engages the work piece, the torque required to rotate the frangible collar fastener increases. When the torque required to rotate the fastener increases beyond a breaking torque (e.g., a threshold torque), the wrenching element breaks off of the collar, thereby leaving the collar attached to the threaded pin. Frangible collar fasteners are used to ensure a consistent toque is applied to all of the fasteners along a part. Frangible collar fasteners are commonly used in the aerospace industry. For example, frangible collar fasteners are often used to hold the wing skin panels together. However, if the frangible collar fastener is misaligned with the threaded pin, the collar becomes cross-threaded with the threaded pin. As a result, the collar becomes lodged against the threaded pin and the wrenching element breaks off of the collar before the collar is properly screwed all way onto the threaded pin. A user (e.g., a worker or technician) that installs the frangible collar fasteners is often unaware that the collar and the threaded pin are cross-threaded because the wrenching element has broken off and appears to have worked properly. However, the cross-threaded fastener does not provide proper holding force and is more likely to fail than a properly threaded fastener.

Example thread alignment tools are disclosed herein that may be used to determine whether and/or when a first threaded part, such as a fastener (e.g., a nut, a frangible collar fastener, etc.), and a second threaded part, such as a threaded pin, are properly aligned. The example thread alignment tools include a socket to hold and rotate the fastener and one or more sensors to measure acoustic waves or signals near the fastener to detect a thread-fall acoustic signal (e.g., a sound) made by a thread-fall event. In particular, the socket is used to rotate the fastener against the end of the threaded pin in a reverse-thread direction (a direction opposite to the direction of the threads), and the sensor(s) monitor for a thread-fall acoustic signal from a thread-fall-event. As used herein, the term "thread-fall event" means a drop or axial movement between a first threaded part and a second threaded part when one or both of the parts is rotated in the reverse-thread direction until a start of a ridge of the thread on one part drops into a groove in the other part, and vice versa. As used herein, the term "thread-fall acoustic signal" means the acoustic wave(s) or signal(s) generated by a thread-fall event. Therefore, a thread-fall acoustic signal indicates the two parts are aligned or substantially aligned (e.g., ±0.5°) and, thus, can be screwed together without the risk of cross-threading the parts. For example, if the fastener and the threaded pin are axially aligned or substantially axially aligned, a thread-fall acoustic signal is made when the fastener is rotated in the reverse-thread direction. Once the thread-fall acoustic signal is detected, the socket can be rotated in the forward-thread direction to screw the fastener onto the threaded pin. Otherwise, if no thread-fall acoustic signal is detected, it can be determined that the fastener and the threaded pin are not aligned or substantially aligned and, thus, should not be screwed together. Thus, the example thread alignment tool uses an active feedback to determine if and/or when the two parts are aligned and can be safely screwed together.

In some examples, the thread alignment tool includes an electronic control unit that analyzes the acoustic signals detected by the sensor(s). In some examples, when a thread-fall acoustic signal is detected, the electronic control unit activates an indicator (e.g., a light, an alarm, etc.) to indicate that the fastener and the threaded pin are aligned and can then be screwed tougher. For example, a user may use a hand-tool (e.g., a wrench) or power tool to turn the socket and rotate the fastener in the reverse-thread direction on the end of the threaded pin. If a thread-fall acoustic signal is detected, the indicator is activated, which alerts the user that the fastener is aligned with the threaded pin. Then, the user can turn the socket in the opposite direction to rotate the fastener in the forward-thread direction and screw the fastener onto the threaded pin. As such, the example thread alignment tool greatly reduces the risk of cross-threading the two parts.

In some examples, a motor assembly including one or more motors is provided for moving the socket and, thus, the fastener. The motor assembly may be coupled to the thread alignment tool to form a motorized wrench, for example. In some examples, the motor assembly includes a rotational motor (e.g., a first motor) that rotates the socket in the reverse-thread and forward-thread directions. The rotational motor may rotate the socket in the reverse-thread direction and, when a thread-fall acoustic signal is detected, the rotational motor may stop and then rotate the fastener in the forward-thread direction to screw the fastener onto the threaded pin. In some examples, the motor assembly also includes an axial motor (e.g., a second motor) to apply a downward pressure on the fastener while the rotational motor rotates the fastener in the reverse-thread or forward-thread direction. In some examples, the motor assembly includes an activation button or trigger that activates the motorized wrench to perform the aligning and/or tightening operation(s).

In some examples, to help block out undesired acoustic signals (e.g., background noise) from the surrounding environment, the thread alignment tool includes a cup (e.g., a damping or acoustic isolation shell) that is disposed around the socket. In some examples, the sensor(s) are coupled to the cup. The cup may be placed over the threaded pin to form a substantially acoustic-proof (e.g., sound-proof) cavity around the fastener and the threaded pin. As a result, the sensor(s) can more accurately detect and distinguish the thread-fall acoustic signal from ambient noise.

Figure 1A:
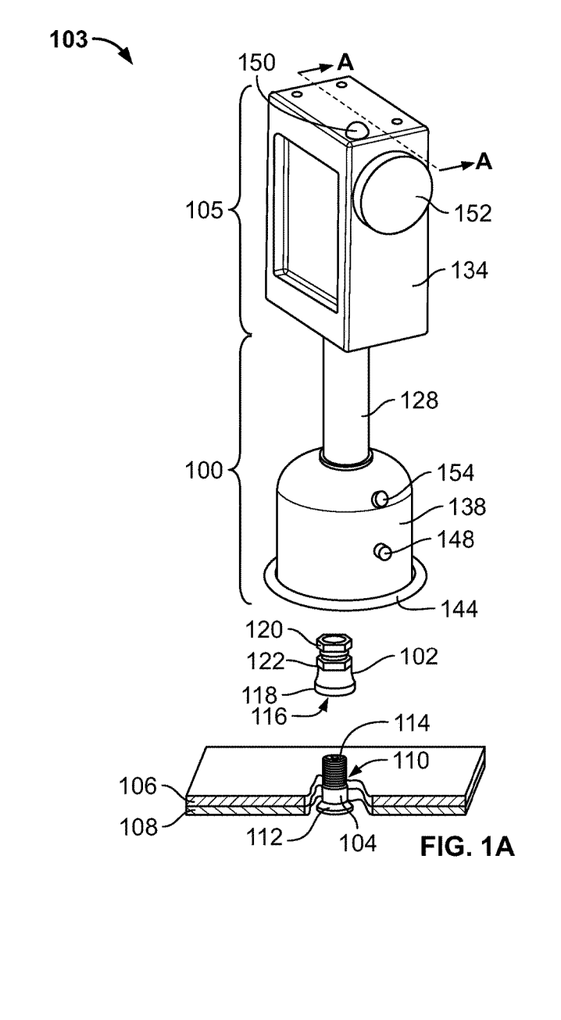
FIG. 1A is a perspective view of an example motorized wrench having an example motor assembly and an example thread alignment tool that may be used to align and/or couple a fastener and a threaded pin in accordance with the teachings of this disclosure.
Figure 1B:
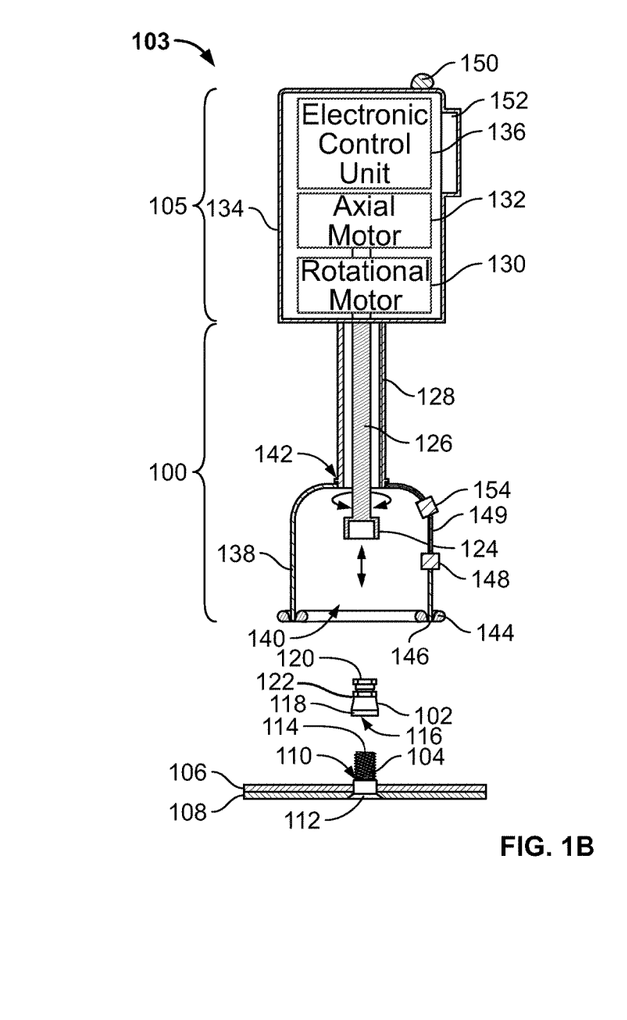
FIG. 1B is a cross-sectional view of the example motorized wrench of FIG. 1A taken along line A-A.

FIGS. 1A and 1B illustrate an example thread alignment tool 100 constructed in accordance with the teachings of this disclosure. In the illustrated example, the example thread alignment tool 100 is part of a motorized wrench 103 that includes an example motor assembly 105. FIG. 1A is a perspective view of the example motorized wrench 103 and FIG. 1B is a cross-sectional view of the example motorized wrench 103 taken along line A-A in FIG. 1A. The example motorized wrench 103 can be used to align and couple a first threaded part and a second threaded part. For example, an example fastener 102 and an example threaded pin 104 (e.g., a bolt) are illustrated in FIGS. 1A and 1B. The fastener 102 and the threaded pin 104 are to be threadably coupled to hold or secure a first part 106 and a second part 108 together. In particular, the threaded pin 104 is inserted through an opening 110 formed in the first and second parts 106, 108. A head 112 of the threaded pin 104 engages a bottom or backside of the second part 108 and an end 114 of the thread pin 104 extends outward through the opening 110 from first part 106. The fastener 102 includes a threaded opening 116 to receive the threaded pin 104. The fastener 102 is to be threadably coupled to the threaded pin 104 to hold the first and second parts 106, 108 between the fastener 102 and the head 112 of the threaded pin 104.

In the illustrated example, the fastener 102 is implemented as a frangible collar fastener, which includes a threaded collar 118 (e.g., a bolt engaging portion) and a nut 120 (e.g., a wrenching element). The nut 120 is coupled to the collar 118 via a breakable connection 122, such that when a predetermined amount of torque is applied to the nut 120 (relative to the collar 118), the connection 122 breaks and the nut 120 detaches from the collar 118, thereby leaving the collar 118 threadably coupled to the threaded pin 104. In some examples, the opening 116 through the nut 120 is not threaded, such that the nut 120 does not connect to the threaded pin 104. In other examples, the fastener 102 may be implemented as any other type of fastener, such as a standard hex nut, a wing nut, a flange nut, an acorn nut, a nylon insert lock nut, etc.

As illustrated in FIG. 1B, the example thread alignment tool 100 includes a socket 124 (e.g., a head, a bit, etc.) to receive and hold the fastener 102. The shape of the socket 124 corresponds to the shape of the fastener 102 and, in particular, the shape of the nut 120 (e.g., a hexagon). In other examples, the socket 124 may have another shape depending on the shape of the corresponding fastener. In the illustrated example, the socket 124 is coupled to a driveshaft 126. The driveshaft 126 may be rotated (e.g., manually or via a motor) in one direction and/or the other to tighten or loosen the fastener 102 on the threaded pin 104. In the illustrated example, the driveshaft 126 is disposed within a shaft tube 128 (e.g., a bearing). The driveshaft 126 is rotatable within the shaft tube 128. Additionally, in some examples, the driveshaft 126 is also moveable in an axial direction through the shaft tube 128.

In some examples, one or more motors are provided to move the driveshaft 126. For example, as illustrated in FIG. 1B, the motor assembly 105 includes a rotational motor 130 (e.g., a first motor, a rotary actuator) that rotates the driveshaft 126 and, thus, rotates the socket 124 and the fastener 102 when the fastener 102 is disposed in the socket 124. The rotational motor 130 is used to rotate the driveshaft 126 in a forward-thread direction to tighten the fastener 102 onto the threaded pin 104 and in a reverse-thread direction to loosen the fastener 102 from the threaded pin 104. In some examples, to move the socket 124 (and, thus, the fastener 102) in an axial direction (e.g., up and down), the example motor assembly 105 includes an axial motor 132 (e.g., a second motor; a linear actuator) that moves the driveshaft 126 in an axial direction through the shaft tube 128. The rotational motor 130 and/or the axial motor 132 may be implemented as brushless direct-current (DC) servo motors, for example. In other examples, other types of motors may be used. In the illustrated example, the motor assembly 105 includes a motor housing 134 (e.g., a controller housing) that is coupled to the shaft tube 128 and contains the rotational motor 130 and the axial motor 132. In the illustrated example, the motorized wrench 103 includes an electronic control unit 136 that controls (e.g., actives or deactivates, changes the speed, changes the torque, changes the rotational direction, etc.) the rotational motor 130 and the axial motor 132.

In the illustrated example of FIGS. 1A and 1B, the thread alignment tool 100 includes a cup 138 (e.g., a damping shell) that forms a cavity 140 in which the socket 124 is disposed. The cup 138 is coupled to an end of the shaft tube 128 (opposite the motor housing 134). As illustrated in FIG. 1B, the driveshaft 126 extends through an opening 142 in the cup 138 and disposes the socket 124 in the cavity 140. The cup 138 helps isolate the acoustic waves inside the cup 138 while dampening or deadening external acoustic waves outside the cup 138, as disclosed in further detail herein. As illustrated in FIGS. 1A and 1B, a seal 144 is coupled to a rim 146 of the cup 138. Therefore, when the cup 138 is placed on the first part 106 around the threaded pin 104, a substantially acoustic-proof (e.g., sound-proof) cavity is formed around the fastener 102 and the threaded pin 104. In an example operation, the thread alignment tool 100 may be moved toward the first part 106 until the seal 144 and the rim 146 engage the first part 106, such that the threaded pin 104 is disposed within the cavity 140. Then, the rotational and axial motors 130, 132 may be activated (individually or simultaneously) to move the fastener 102 toward the end 114 of the threaded pin 104 and/or rotate the fastener 102 relative to the threaded pin 104.

To determine whether the fastener 102 is aligned with the threaded pin 104, the example thread alignment tool 100 includes a first sensor 148 that measures or detects acoustic waves or signal near the fastener 102 and the threaded pin 104. In the illustrated example, the first sensor 148 is implemented as an acoustic transducer (e.g., a microphone) that converts acoustic waves into an electrical signals that are analyzed by the electronic control unit 136. The example sensor 148 is used to detect a thread-fall acoustic signal generated by a thread-fall event between the fastener and the threaded pin. A thread-fall acoustic signal indicates the fastener 102 and the threaded pin 104 are aligned or substantially aligned and may be screwed together without the risk of cross-threading. The thread-fall acoustic signal may include one or more parts in any frequency, such as infrasound, sound (e.g., 20-20,000 hertz (Hz)), ultra-sound, etc.

Figure 2A:
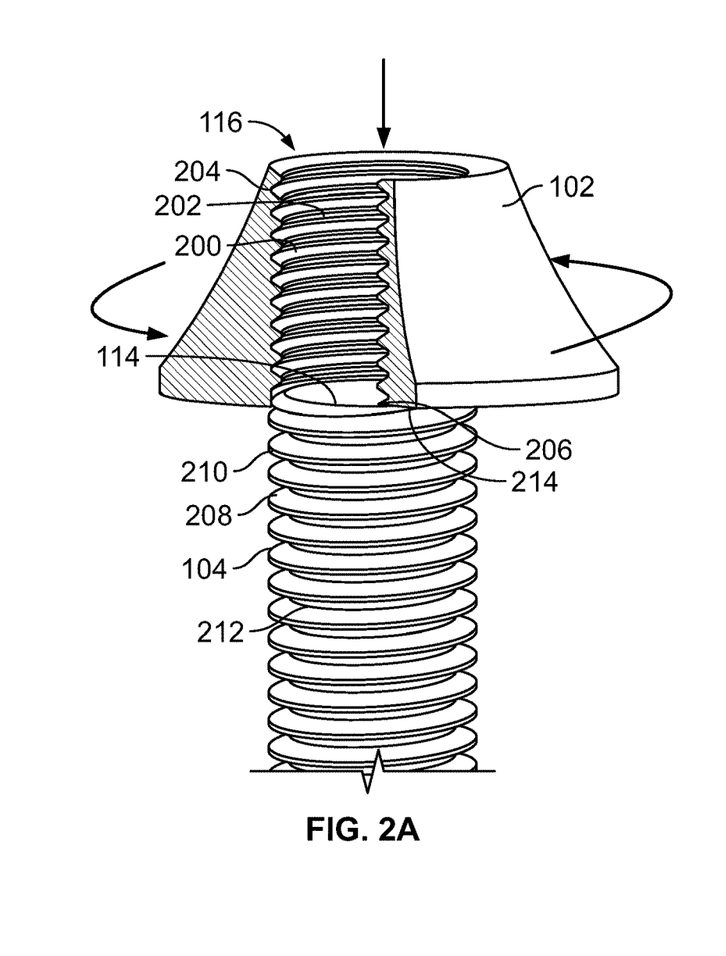
FIG. 2A shows a partially sectioned view of the example fastener of FIG. 1A engaged with an end of the example threaded pin and rotating in a reverse-thread direction.
Figure 2B:
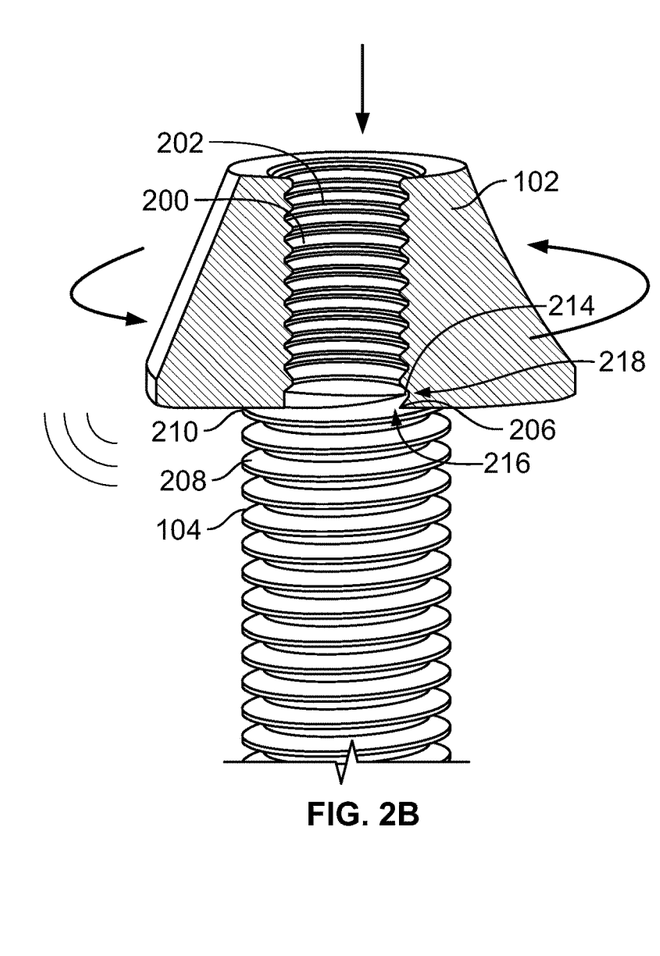
FIG. 2B shows the example fastener in FIG. 2A after an example thread-fall event.

For example, FIG. 2A shows a partial cross-sectioned view of the example fastener 102 engaged with the end 114 of the threaded pin 104. In the illustrated example, the fastener 102 includes an internal thread 200 formed by a ridge 202 that is curved around an inner wall 204 of the opening 116. A start 206 of the ridge 202 is located at the bottom of the opening 116. Similarly, the threaded pin 104 includes an external thread 208 formed by a ridge 210 that wraps around a body 212 of the threaded pin 104. A start 214 of the ridge 210 of the external thread 208 is located at or near the end 114 of the threaded pin 104. In an example alignment operation, the fastener 102 is pressed (e.g., via the axial motor 132) downward onto the end 114 of the threaded pin 104 and rotated (e.g., via the rotational motor 130) in the reverse-thread direction (counter-clockwise looking down on the fastener 102). As the fastener 102 is rotated, the first turn of the ridge 202 of the internal thread 200 slides against the first turn of the ridge 210 of the external thread 208. If the fastener 102 and the threaded pin 104 are substantially axially aligned (e.g., ±0.5°), the fastener 102 drops or moves a small amount axially toward the threaded pin 104 when the start 206 of the ridge 202 of the internal thread 200 and the start 214 of the ridge 210 of the external thread 208 pass each other, as illustrated in FIG. 2B. In particular, the start 206 of the ridge 202 of the internal thread 200 falls into a groove 216 formed between the start 214 of the ridge 210 and the next turn of the ridge 210 of the external thread 208. Likewise, the start 214 of the ridge 210 of the external thread 208 moves into a groove 218 formed between the start 206 of the ridge 202 and the next turn of the ridge 202 of the internal thread 200. This drop or movement creates a thread-fall acoustic signal, which can be detected by the first sensor 148 (FIGS. 1A and 1B). In other words, the drop in the thread-fall event only occurs when the fastener 102 and the threaded pin 104 are axially aligned or substantially axially aligned. Every time the fastener 102 and/or the threaded pin 104 are rotated 360°, a thread-fall event occurs (if the fastener 102 and the threaded pin 104 are substantially aligned). This acoustic event indicates that the fastener 102 and the threaded pin 104 are substantially axially aligned and that the starts 206, 214 of the threads 200, 208 are at the beginning of the corresponding grooves 216, 218. Otherwise, if the fastener 102 and the threaded pin 104 were not substantially axially aligned, the threads 200, 208 would continually ride along each other and no thread-fall event would occur and, thus, no thread-fall acoustic signal would be generated. In such an instance, the lack of a thread-fall event (and, thus, a thread-fall acoustic signal) means that the fastener 102 and the threaded pin 104 are misaligned and should be aligned before tightening. Otherwise, if the fastener 102 and the threaded pin 104 are substantially aligned and a thread-fall event occurs, the starts 206, 214 of the ridges 210, 202 are in the corresponding grooves 216, 218, and the likelihood of cross-threading the fastener 102 and threaded pin 20 is significantly reduced (if not completely eliminated). As such, the fastener 102 can then be rotated in the forward-thread direction to tighten the fastener 102 onto the threaded pin 104 without the risk of cross-threading the two parts.

Referring back to FIGS. 1A and 1B, the first sensor 148 measures the acoustic waves in the cup 138 while the fastener 102 is rotated in the reverse-thread direction against the end 114 of the threaded pin 104. In the illustrated example, the first sensor 148 is coupled to the cup 138 adjacent the socket 124. The first sensor 148 is communicatively coupled to the electronic control unit 136 via a wire 149 (FIG. 1B) embedded in the cup 138 and the shaft tube 128. When a thread-fall acoustic signal is a detected, the electronic control unit 136 determines the fastener 102 and the threaded pin 104 are aligned. In some examples, the electronic control unit 136 stops the rotational motor 130 once the thread-fall acoustic signal is detected. Then, the electronic control unit 136 may activate the rotational motor 130 to rotate the driveshaft 126 in the forward-thread direction, thereby screwing or threading the fastener 102 onto the threaded pin 104. In some examples, the rotational motor 130 is activated to rotate the fastener 102 in the forward-thread direction until the nut 120 separates from the collar 118. Additionally or alternatively, the electronic control unit 136 may control the rotational motor 130 to apply a predetermined torque to the fastener 102 and/or rotate the fastener 102 a predetermined number of turns (e.g., 5 turns).

Additionally or alternatively, in some examples, when a thread-fall event is detected, the electronic control unit 136 activates (e.g., via a control signal) an indicator 150 (FIGS. 1A and 1B). In the illustrated example, the indicator 150 is implemented as a light disposed on the motor housing 134. In other examples, the indicator 150 may be an alarm, an icon on a display screen (e.g., a display screen on the motor housing 134, a display on a handheld device such as a phone, a tablet, etc.), and/or any other audio or visual signal to indicate that the fastener 102 and the threaded pin 104 are aligned.

In some examples, the motorized wrench 103 includes an activation button 152 (e.g., a trigger), which may trigger the motor assembly 105 and/or the thread alignment tool 100 to perform one or more operations to align and/or couple the fastener 102 to the threaded pin 104 (e.g., the operations disclosed in connection with FIGS. 3A-3E). For example, a user may load the fastener 102 into the socket 125 and place the cup 138 over the threaded pin 104. In some examples, the nut 120 of the fastener 102 is held in the socket 124 via interference fit. Additionally or alternatively, in other examples, a magnet or a retaining element may be used. The user may then press the activation button 152, which causes the electronic control unit 136 to activate the axial motor 132 to push the fastener 102 against the end 114 of the threaded pin 104 and activate the rotational motor 130 to rotate the fastener 102 in the reverse-thread direction. When the electronic control unit 136 detects a thread-fall event (based on a thread-fall acoustic signal measured by the first sensor 148), the electronic control unit 136 stops the rotational motor 130 and then activates the rotational motor 130 to rotate the fastener 102 in the forward thread direction to tighten the fastener 102 onto the threaded pin 104. Thus, in some examples, the activation button 152 causes the thread alignment tool 100 to align and couple the fastener 102 to the threaded pin 104. In such an example, a user (e.g., a worker or technician) may carry the motorized wrench 103 from pin to pin and perform the above sequence over-and-over. In other examples, the motorized wrench 103 may be used to determine whether the fastener 102 and the threaded pin 104 are aligned (e.g., via the indicator 150). Then, the user may remove the motorized wrench 103 and use another device (e.g., a power tool or hand tool) to tighten the fastener 102 onto the threaded pin 104.

In some examples, when rotating the fastener 102 in the reverse-thread direction, the rotational motor 130 rotates the driveshaft 126 at a first speed, and when rotating the fastener 102 in the forward-thread direction, the rotational motor 130 rotates the driveshaft 126 at a second speed greater than the first speed. In other words, when aligning the fastener 102 and the threaded pin 104, the fastener 102 is rotated at a slower speed. Then, once aligned, the fastener 102 can be rotated at a relatively fast speed in the forward-thread direction to tighten the fastener 102 onto the threaded pin 104. In other examples, the speeds may be the same.

In some examples, to help distinguish a thread-fall acoustic signal from other acoustic waves (e.g., noise) generated by the surrounding environment (e.g., a manufacturing plant), the example thread alignment tool 100 includes a second sensor 154 (e.g., an acoustic transducer). The second sensor 154 is also coupled to the cup 138 to measure acoustic waves within the cavity 140. The second sensor 154 is communicatively coupled to the electronic control unit 136 via a wire embedded in the cup 138 and/or the shaft tube 126 (e.g., similar to the wire 149). The first and second sensors 148, 154 are spaced apart and calibrated so that acoustic waves generated within the cavity 140 are in phase, whereas acoustic waves generated outside of the cup 138 are out of phase (e.g., by a microsecond or more). The electronic control unit 136 may include a signal analyzer (as disclosed in further detail herein) to identify and block (e.g., attenuate) undesired noise in the acoustic signals and, thus, assist in isolating thread-fall acoustic waves corresponding to a thread-fall event. In some examples, only one sensor is implemented with the example thread alignment tool 100. In other examples, more than two sensors may be implemented.

In some examples, the cup 138 is constructed of and/or coated with a sound deadening or acoustic damping material, such as an asphaltic material, which helps isolate acoustic waves generated within the cavity 140 from undesired acoustic waves generated in the environment outside of the cavity 140. Further, the seal 144 may be constructed of a rubber material (e.g., neoprene), a plastic material, a foam and/or any other type acoustic sealing material. The seal 144 forms intimate contact between the cup 138 and the surface of the first part 106 to block out ambient noise. As such, the cup 138 helps to reject undesired noise in the outside environment from being detected by the first and second sensor 148, 154, so that the first and second sensors 148, 154 can more accurately detect the thread-fall acoustic signal.

In the illustrated example, the cup 138 is generally shaped as a dome. However, in other examples, the cup 138 may be shaped differently. For example, the cup 138 may be cube shaped. Also, while in the illustrated example the cup 138 substantially covers the fastener 102 and the threaded pin 104 when placed on the first part 106, in other examples, the cup 138 may have one or more openings. Further, the example first and second sensors 148, 154 may be attached to another structure (e.g., a flange or bracket) inside the cup 138 to be disposed near the fastener 102.

While in the illustrated example of FIGS. 1A and 1B the electronic control unit 136 is disposed in the motor housing 134, in other examples, the electronic control unit 136 may be separate from the motor housing 134. For example, the electronic control unit 136 may be implemented in a handheld device (e.g., a phone, a tablet, etc.). The electronic control unit 136 may communicate with the rotational and axial motors 130, 132, the sensors 148, 154, and/or the other component(s) of the motorized wrench 103 via any wired or wireless (e.g., Bluetooth®) communication device. In some examples, a user may control and/or view data (e.g., the live acoustic signal, such as in FIG. 5) obtained by the rotational and axial motors 130, 132, the sensors 148, 154, etc. via the handheld device.

Figure 3A:
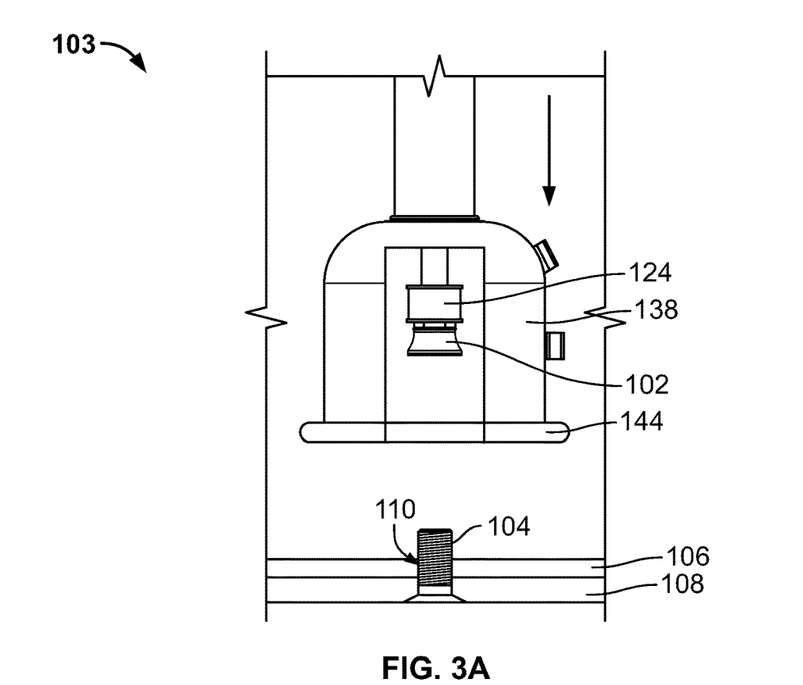
FIGS. 3A-3E illustrate an example sequence of aligning and attaching the example fastener and the example threaded pin of FIGS. 1A and 1B using the example motorized wrench.
Figure 3B:
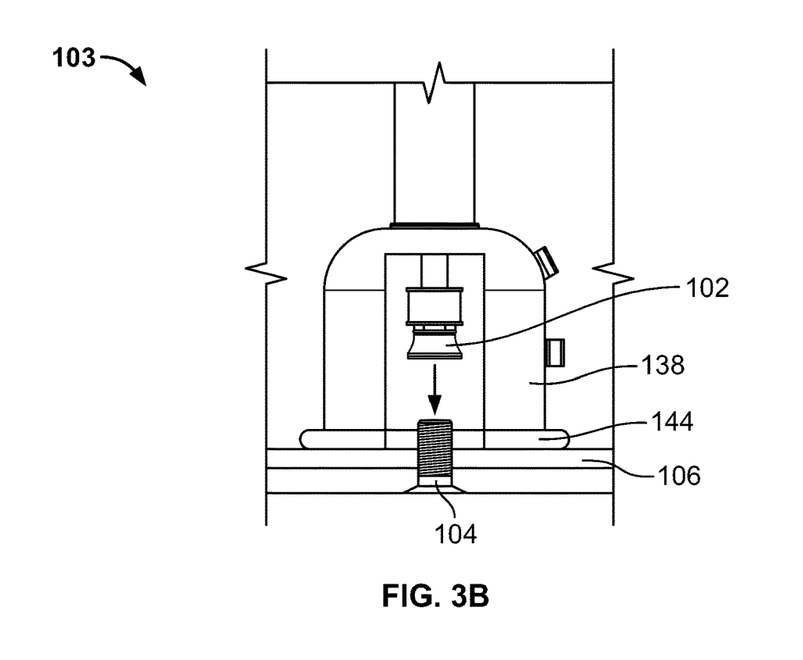

FIGS. 3A-3E illustrate an example sequence of aligning and connecting the threaded fastener 102 and the thread pin 104 as performed using the example motorized wrench 103 of FIGS. 1A and 1B. In FIGS. 3A-3E, a portion of the cup 138 has been removed to expose the components therein. As illustrated in FIG. 3A, the threaded pin 104 is inserted through the opening 110 in the first and second parts 106, 108 and the fastener 102 is inserted into the socket 124. Then, motorized wrench 103 is moved toward the threaded pin 104 until the cup 138 engages the first part 106 around the threaded pin 104, as illustrated in FIG. 3B. In particular, the seal 144 engages the first part 106 around the thread pin 104. In some examples, the motorized wrench 103 is moved via a user (e.g., via human interaction). Additionally or alternatively, the motorized wrench 103 may be carried by a motorized platform that moves the motorized wrench 103. When the seal 144 is engaged with the first part 106, the cup 138 forms a sound isolated cavity around the fastener 102 and the threaded pin 104.

Figure 3C:
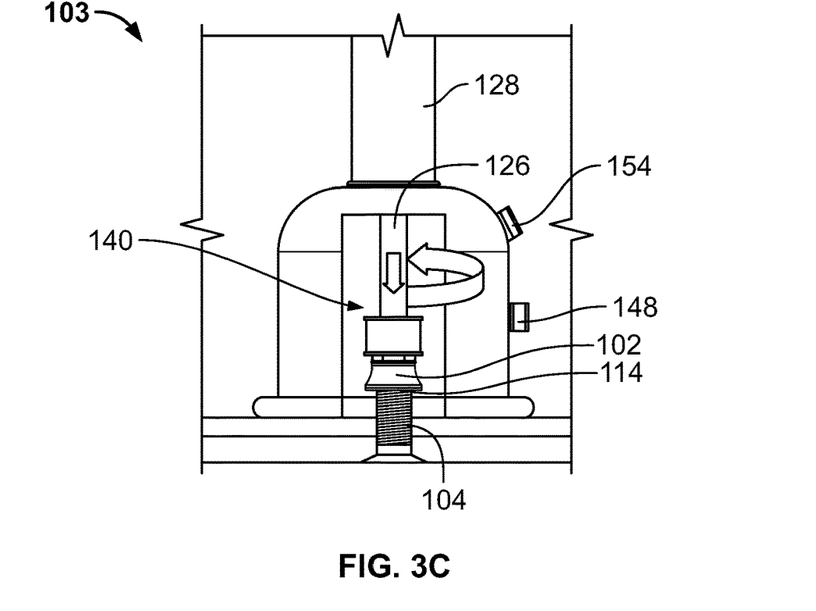
Figure 3D:
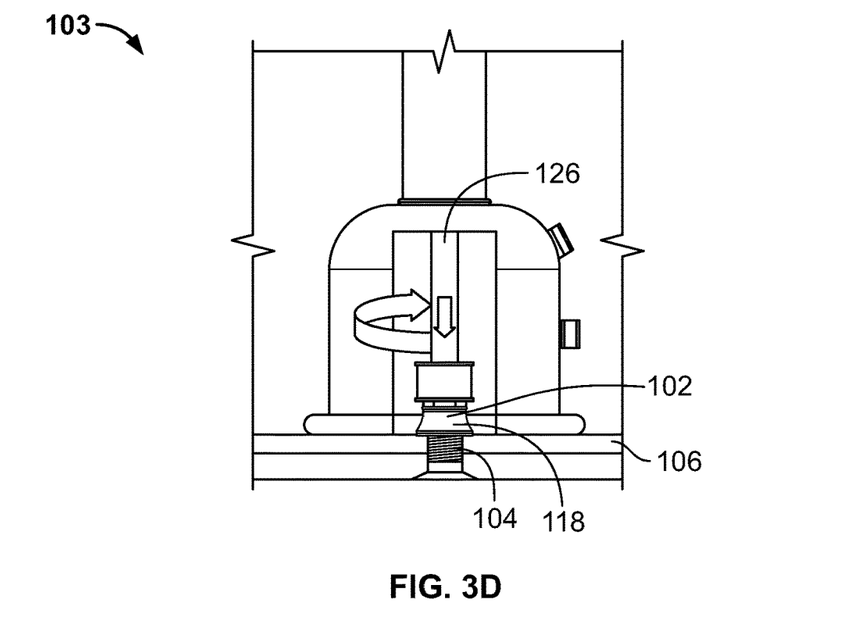

In FIG. 3C, the driveshaft 126 is moved axially through the shaft tube 128 to move the fastener 102 toward the end 114 of the threaded pin 104. In some examples, the driveshaft 126 is moved axially via the axial motor 132 (FIG. 1B). Once the fastener 102 is engaged with the end 114 of the threaded pin 104, the electronic control unit 136 (FIG. 1B) activates the rotational motor 130 (FIG. 1B) to rotate the driveshaft 126 in the reverse-thread direction. While the driveshaft 126 rotates, the axial motor 132 continues to apply pressure toward the threaded pin 104. As the fastener 102 is rotating, the first and second sensors 148, 154 measure the acoustic waves in the cavity 140. If a thread-fall event occurs, a thread-fall acoustic signal is generated, which is measured by the first and second sensors 148, 154. The electronic control unit 136 (FIG. 1B) then stops the rotational motor 130 from rotating the driveshaft 126 in the reverse-thread direction and activates the rotational motor 130 to rotate the driveshaft 126 in the forward-thread direction (opposite the reverse-thread direction) to tighten the fastener 102 onto the threaded pin 104, as illustrated in FIG. 3D. When a sufficient amount of torque is applied to the nut 120 (FIGS. 1A and 1B) of the fastener 102, the nut 120 separates from of the collar 118, thereby leaving the collar 118 attached to the threaded pin 104. In particular, as the collar 118 engages the first part 106, the friction between the collar 118 and the first part 106 requires an increasing amount of torque to continue rotating the fastener 102. Eventually, the torque applied to the nut 120 causes the nut 120 to separate from the collar 118 (e.g., via the breakable connection 122 (FIGS. 1A and 1B)). In some examples, the electronic control unit 136 (FIG. 1B) stops the rotational motor 130 (FIG. 1B) once the nut 120 breaks away or separates from the collar 118. In other examples, the electronic control unit 136 may control the rotational motor 130 to apply a predetermined amount of torque and/or rotate a predetermined number of turns before stopping.

Figure 3E:
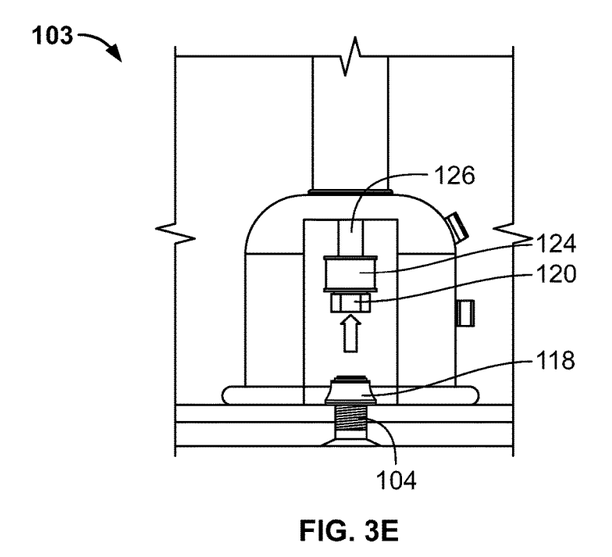

After the collar 118 is attached to the threaded pin 104, the driveshaft 126 may be moved axially away from the threaded pin 104 (e.g., via the axial motor 132), as illustrated in the example of FIG. 3E. The nut 120 may be removed from the socket 124 and the example sequence may be repeated again on another threaded pin with another fastener. As described herein, this example sequence can be repeated numerous times. In some examples, the sequence of FIGS. 3A-3E is activated via the activation button 152.

Figure 4:
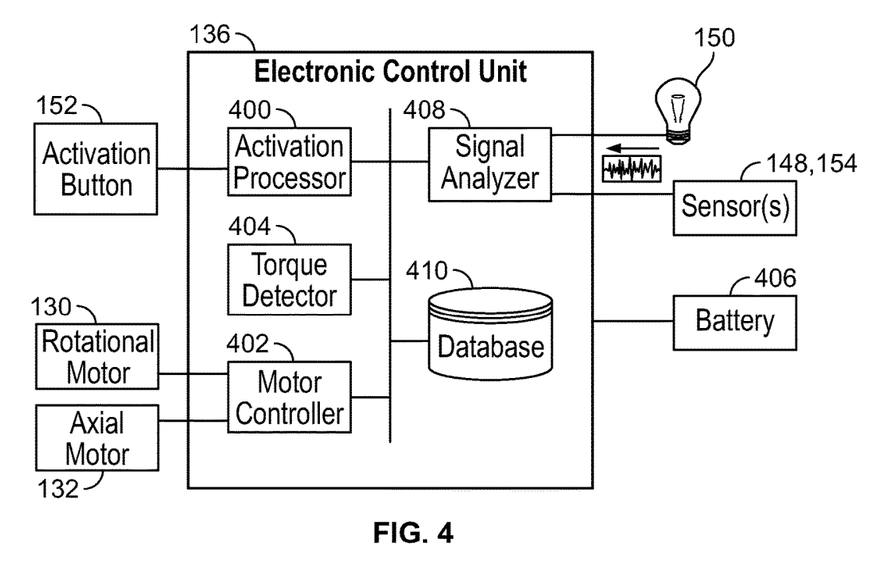
FIG. 4 is a block diagram representation of an example electronic control unit that may be implemented by the example motorized wrench of FIGS. 1A and 1B.

FIG. 4 is an example block representation of the example electronic control unit 136 implemented with the example thread alignment tool 100 as part of the example motorized wrench 103 (FIGS. 1A and 1B). In the illustrated example, the electronic control unit 136 includes an activation processor 400. The activation processor 400 may receive an input signal from the activation button 152 and activate the electronic control unit 136 to perform an alignment operation and/or tightening operation, such as the operation(s) disclosed in connection with FIGS. 3A-3E and/or the operation(s) disclosed in connection with the flowchart in FIG. 7. For example, the activation processor 400 may control the electronic control unit 136 to lower the driveshaft 126, rotate the driveshaft 126, monitor for a thread-fall acoustic signal, rotate the driveshaft 126 in the opposite direction, etc. In the illustrated example, the electronic control unit 136 includes a motor controller 402 to control the rotational motor 130 and the axial motor 132. For example, the motor controller 402 may activate the rotational motor 130 (e.g., via a control signal) to rotate in one direction or the opposite direction and/or may activate the axial motor 132 to move the driveshaft 126 (FIG. 1B) up or down.

In the illustrated example, the electronic control unit 136 includes a torque detector 404 to detect an amount of torque applied by the rotational motor 130 to the fastener 102 (FIGS. 1A and 1B). In some examples, the rotational motor 130 may tighten the fastener 102 to a predetermined torque, as sensed by the torque detector 404. In some examples, the fastener 102 is a frangible collar fastener, which has a nut or wrenching element that breaks away from a collar when a predetermined torque is applied. In such an example, the torque detector 404 may detect a decrease in torque applied by the rotational motor 130, which indicates the wrenching element has detached and a predetermined torque has been reached.

In some examples, the motorized wrench 103 includes a battery 406 to provide power to the electronic control unit 136, the rotational and axial motors 130, 132, and/or any other component of the example thread alignment tool 100 and/or the motor assembly 105. In some examples, the battery 406 is disposed in the motor casing 134 (FIGS. 1A and 1B). Additionally or alternatively, the motorized wrench 103 may receive power from a generator and/or power from a public and/or private power grid.

In the illustrated example of FIG. 4, the electronic control unit 136 includes a signal analyzer 408 that analyzes the acoustic signals (e.g., the acoustic signatures) from the first and/or second sensor(s) 148, 154 and determines whether a thread-fall event has occurred such as, for example, based on a detected thread-fall acoustic signal. In some examples, the signal analyzer 408 activates the indicator 150 when a thread-fall acoustic signal is detected. Additionally or alternatively, the motor controller 402 may stop the rotational motor 130 and/or activate the rotational motor 130 to rotate in the opposite direction (the forward-thread direction).

Figure 5:
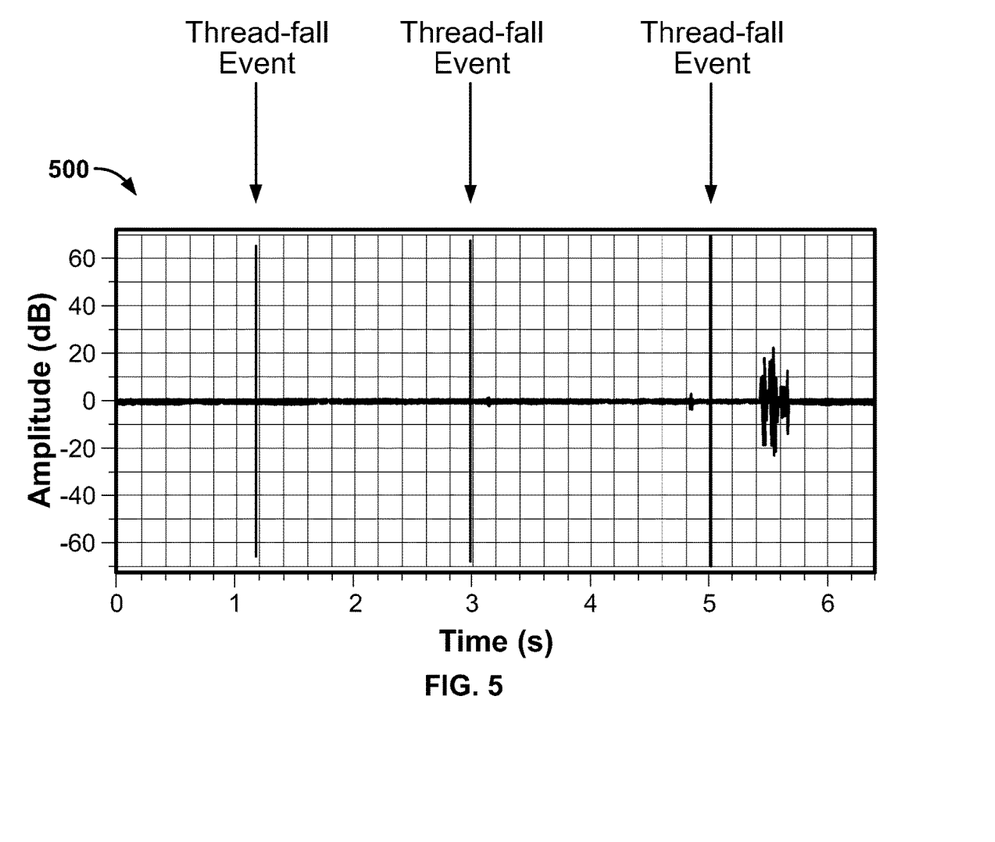
FIG. 5 illustrates an example graph showing example thread-fall acoustic signals.

In some examples, the signal analyzer 408 identifies a thread-fall acoustic signal based on a spike (e.g., a point of interest) in the level or amplitude of the acoustic signal. For example, FIG. 5 shows an example graph 500 of an acoustic signal recorded while a fastener is rotated in a reverse-thread direction against an end of a threaded pin. The X-axis represents time in seconds and the Y-axis represents the amplitude of the acoustic signal in decibels. The fastener is rotated more than three times, each time generating a thread-fall event. As illustrated in FIG. 5, three distinct spikes are seen in the acoustic signal where a thread-fall event occurred. As such, a thread-fall event generates a noticeable acoustic effect, a thread-fall acoustic signal (as compared to the baseline noise around 0 decibels (dB)), which indicates the fastener and the threaded pin are substantially axially aligned.

In some examples, the signal analyzer 408 of FIG. 4 identifies a spike (e.g., a point of interest) in the acoustic signal as being a thread-fall acoustic signal when the spike exceeds an amplitude threshold (e.g., 50 dB). The amplitude threshold may be based on, for example, on one or more of the amount of downward pressure applied by the axial motor 132, the type of material of the fastener 102 and/or the threaded pin 104, the type of material of the first and/or second parts 106, 108, the size of the fastener 102 and/or the threaded pin 104, and/or the speed at which the fastener 102 is rotated. In some examples, a plurality of different amplitude thresholds are stored in the database 410. For example, a number of calibration tests may be performed using the example thread alignment tool 100 with different combinations of materials, pressure, etc., to determine the amplitude at which the thread-fall acoustic signals are generated.

In some examples, the signal analyzer 408 may monitor for a spike in amplitude occurring at a certain frequency or in a frequency range (e.g., 1300-1800 Hz). The frequency or frequency range may be audible or inaudible to a human. For example, a number of calibration tests may be performed using different combinations of material(s), pressure, etc. to determine a frequency range at which the thread-fall acoustic signal is generated. The signal analyzer 408 may then isolate a particular frequency range in the acoustic signal and determine whether a thread-fall acoustic signal has occurred based on an increase or spike in the isolated frequency range. Additionally or alternatively, in some examples, the acoustic signals are compared to one or more reference signals stored in a database 410 to determine whether a thread-fall acoustic signal has occurred. For example, the database 410 may include a plurality of reference thread-fall acoustic signatures, which can be compared to the current acoustic signal to determine if any similar acoustic signatures have occurred.

In some examples, the signal analyzer 408 filters or blocks out ambient noise from the surrounding environment. For example, the signal analyzer 408 may analyze the acoustic signals from the first and second sensors 148, 154 and determine whether the acoustic signals are within phase or out of phase. Acoustic signals that are out of phase may be blocked, for example. Additionally or alternatively, the signal analyzer 408 may include one or more filters to filter out noise above and/or below a certain frequency (e.g., using a band-pass filter, a low-pass filter and/or a high-pass filter). For example, the thread alignment tool 100 may be used in an environment with percussive operations such as riveting or hammering. To avoid falsely identifying one of these signal as a thread fall acoustic signal, the example signal analyzer 408 may filter out the acoustic waves or signals at particular frequencies (or a range of frequencies) corresponding to those percussive operations. In some examples, if the ambient acoustic signal contains a range of signals (e.g., sound) in the region of interest without actuation of the rotational motor 130 and/or the axial motor 132, the example electronic control unit 136 may wait until the ambient acoustic signals cease prior to starting the thread fall detection operation.

Figure 6:
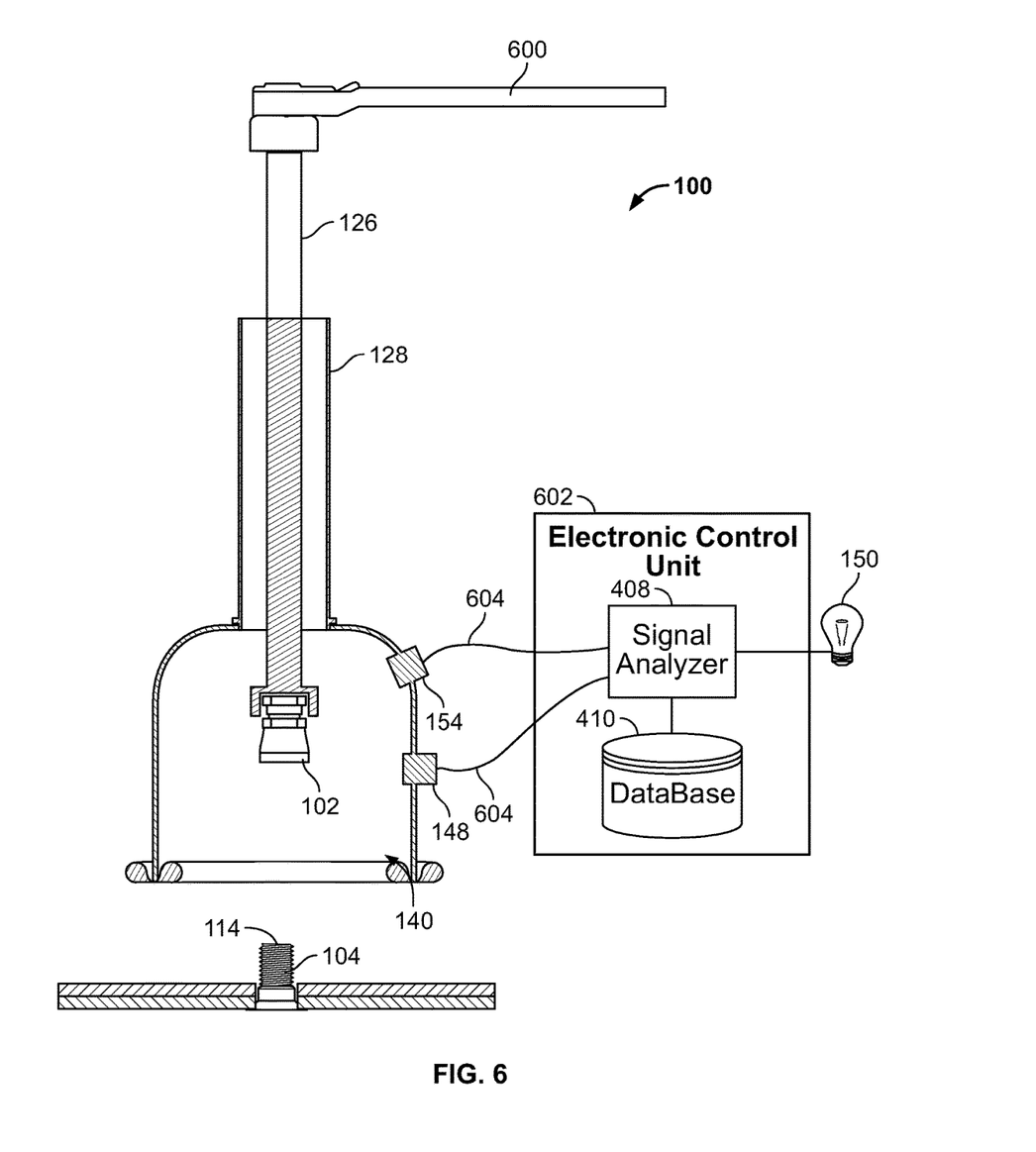
FIG. 6 illustrates the thread alignment tool of FIGS. 1A and 1B in which rotation and/or axial movement of the example fastener may be manually or partially manually controlled.

While in the illustrated example of FIGS. 1A and 1B the thread alignment tool 100 is implemented with one or more motors to move the driveshaft 126, in other examples, the driveshaft 126 may be moved manually such as, for example, with a wrench or other handheld tool. For example, FIG. 6 illustrates an example of the thread alignment tool 100 without the motor assembly 105 as utilized in the example of FIGS. 1A and 1B. Instead, a user may use his/her hands, a hand-tool such as a wrench and/or a power tool such as a pneumatic or electric wrench to rotate and/or axially move the driveshaft 126. In FIG. 6, an example wrench 600 is depicted. In such an example, a user may connect the wrench 600 to the driveshaft 126 and push the driveshaft 126 through the shaft tube 128 to engage the fastener 102 with the end 114 of the threaded pin 104. The user may then rotate the driveshaft 126 (via the wrench 600) to turn the fastener 102 in the reverse-threaded direction. As the fastener 102 is rotating, the first and second sensors 148, 154 measure the acoustic signals in the cavity 140. The signals are communicated to an electronic control unit 602 that includes the signal analyzer 408 and the database 410, which are disclosed in connection with FIG. 4. To avoid redundancy, a description of the signal analyzer 408 and the database 410 are not repeated. Instead, the interested reader is referred back to the discussion of FIG. 4 for a description of the signal analyzer 408 and the database 410. In the illustrated example, the sensors 148, 154 are communicatively coupled to the electronic control unit 602 via wires 604. In others examples, the sensors 148, 154 may wirelessly communicate with the electronic control unit 136. When the signal analyzer 408 identifies a thread-fall acoustic signal, the signal analyzer 408 may activate the indicator 150 (e.g., a light) to alert to the user that the threads are aligned. The electronic control unit 602 may be implemented in a handheld device, for example, such as a phone or a tablet, and the indicator 150 may be a light or signal on a display screen of the handheld device. Once the user is alerted that the fastener 102 and the threaded pin 104 are aligned, the user may rotate the driveshaft 126 (via the wrench 600) in the opposite direction to turn the fastener 102 in the forward-thread direction to tighten the fastener 102 onto the threaded pin 104. In other examples, the user may remove the thread alignment tool 100 (while leaving the fastener 102 on the end 114 of the threaded pin 104), and tighten the fastener 102 with a separate tool (e.g., a power tool). Thus, the example alignment tool 100 can be used to align and/or start a fastener before a motorized tool screws the fastener 102 onto the threaded pin 104.

While example manners of implementing the electronic control units 136, 602 are illustrated in FIGS. 4 and 6, one or more of the elements, processes and/or devices illustrated in FIGS. 4 and 6 may be combined, divided, re-arranged, omitted, eliminated and/or implemented in any other way. Further, the example activation processor 400, the example motor controller 402, the example torque detector 404, the example signal analyzer 408, the example database 410 and/or, more generally, the example electronic control unit 136 of FIG. 4 and/or the example electronic control unit 602 of FIG. 6 may be implemented by hardware, software, firmware and/or any combination of hardware, software and/or firmware. Thus, for example, any of the example activation processor 400, the example motor controller 402, the example torque detector 404, the example signal analyzer 408, the example database 410 and/or, more generally, the example electronic control unit 136 of FIG. 4 and/or the example electronic control unit 602 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example activation processor 400, the example motor controller 402, the example torque detector 404, the example signal analyzer 408, and/or the example database 410 is/are hereby expressly defined to include a tangible computer readable storage device or storage disk such as a memory, a digital versatile disk (DVD), a compact disk (CD), a Blu-ray disk, etc. storing the software and/or firmware. Further still, the example electronic control unit 136 of FIG. 4 and/or the electronic control unit 602 may include one or more elements, processes and/or devices in addition to, or instead of, those illustrated in FIGS. 4 and 6, and/or may include more than one of any or all of the illustrated elements, processes and devices.

Figure 7:
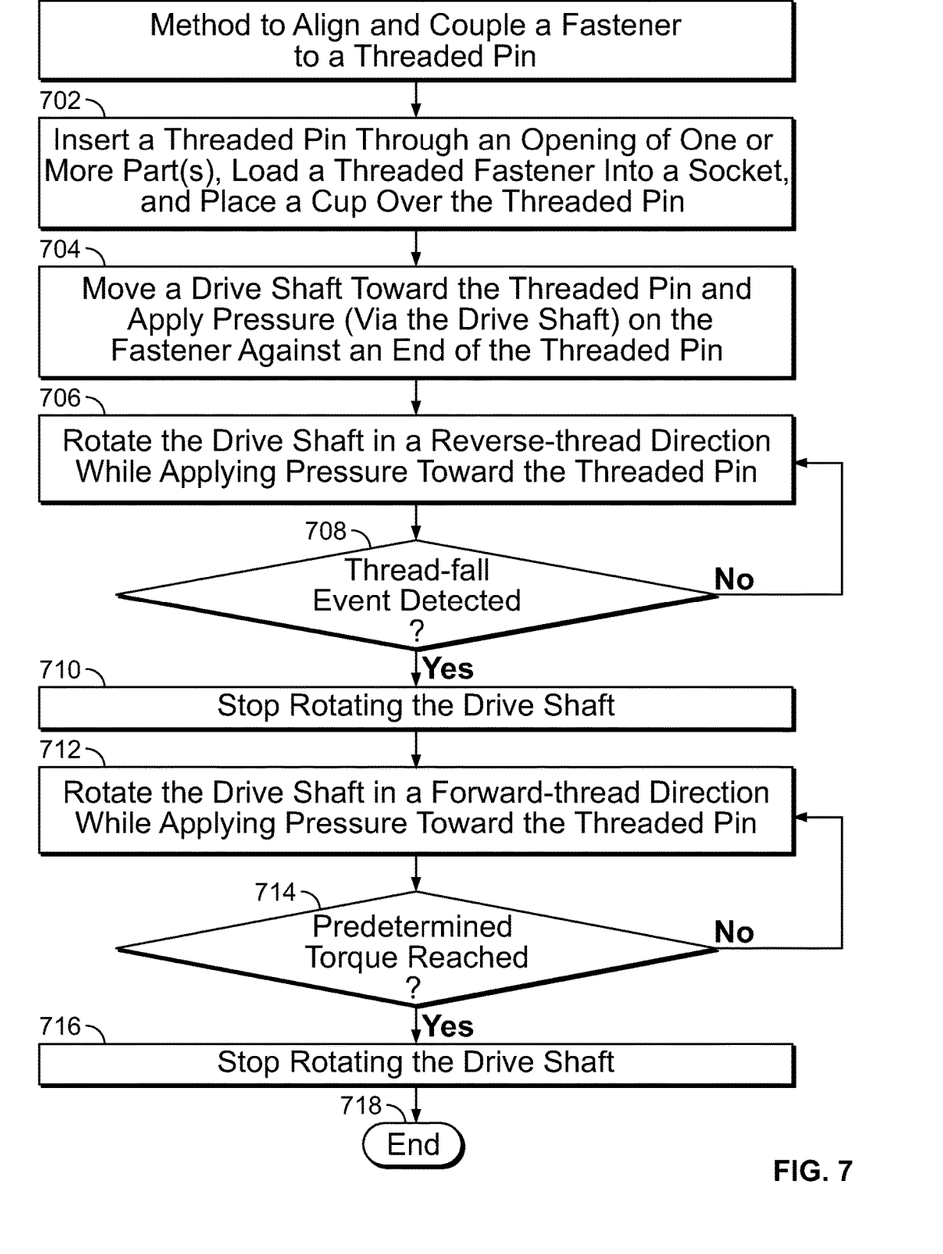
FIG. 7 is a flowchart representative of an example method that may be executed at least in part by machine readable instructions by the example electronic control unit of FIG. 4 to implement the example motorized wrench of FIGS. 1A and 1B.

A flowchart representative of an example method for implementing the example electronic control unit 136 of FIG. 4 (and, at least in part by the example electronic control unit 602 of FIG. 6) is shown in FIG. 7. In this example, the method may be implemented, at least in part, by machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example electronic control unit 136 and/or the electronic control unit 602 may alternatively be used. For example, the order of execution of the blocks may be changed, and/or some of the blocks described may be changed, eliminated, or combined.

As mentioned above, the example method of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is a flowchart representative of an example method 700 to align and couple a fastener and a threaded pin using the example motorized wrench 103. The example method 700 may be performed at least in part by machine readable instructions as implemented by the example electronic control unit 136. The example method 700 is described in connection with the motorized wrench 103 illustrated in FIGS. 1A and 1B and in connection with the sequence illustrated in FIGS. 3A-3E.

At block 702, the threaded pin 104 is inserted through the opening 110 of the first and second parts 106, 108. In some examples, this process may be automated. Additionally, the fastener 102 is inserted into the socket 124 of the thread alignment tool 100 (e.g., as illustrated in FIG. 3A), and the thread alignment tool 100 is placed over the threaded pin 104. For example, referring to FIG. 3B, the motorized wrench 103 is moved toward the threaded pin 104 until the cup 138 covers the threaded pin 104.

At block 704, the motor controller 402 activates the axial motor 132 to move the driveshaft 126 toward the threaded pin 104 (e.g., downward) until the fastener 102 makes contact with the end 114 of the threaded pin 104, as illustrated in FIG. 3B. In some examples, the axial motor 132 continues to apply pressure on the fastener 102 against the threaded pin 104. In other examples, such as illustrated in FIG. 6, the movement of the driveshaft 126 may be performed manually by a user with his/her hand and/or a hand tool (e.g., a wrench).

At block 706, the motor controller 402 activates the rotational motor 130 to rotate the driveshaft 126 (and, thus, the socket 124 and the fastener 102) in a reverse-thread direction while the fastener 102 is pressed against the end 114 of the threaded pin 104 (e.g., via force from the axial motor 132), as illustrated in FIG. 3C. In other examples, such as illustrated in FIG. 6, the driveshaft 126 may be rotated manually by a user with his/her hand and/or a hand tool (e.g., a wrench).

At block 708, the signal analyzer 408 determines whether a thread-fall event has occurred. In particular, the acoustic waves produced in the cavity 140 of the cup 138 are detected by the first and second sensors 148, 154. When a thread-fall event occurs, a thread-fall acoustic signal is generated (e.g., as illustrated in FIG. 5). When the signal analyzer 408 identifies a thread-fall acoustic signal in the acoustic waves detected by the sensor(s) 148, 154, the signal analyzer 408 determines a thread-fall event has occurred. Otherwise, if no thread-fall acoustic signal is detected, the rotational motor 130 continues to rotate the driveshaft 126 (at block 706). As such, the example signal analyzer 408 can determine whether the fastener 102 and the threaded pin 104 are aligned (based on the occurrence of a thread-fall acoustic signal) before screwing the fastener 102 onto the threaded pin 104. In some examples, when the signal analyzer 408 detects a thread-fall acoustic signal, the signal analyzer 408 activates the indicator 150 (e.g., via a control signal), to indicate to the user that the fastener 102 and the threaded pin 104 are aligned.

After a thread-fall event is detected (at block 708), the motor controller 402 stops (e.g., deactivates) the rotational motor 130 from rotating the driveshaft 126 in the reverse-thread direction (at block 710). At block 712, the motor controller 402 activates the rotational motor 130 to rotate the driveshaft 126 (and, thus, the socket 124 and the fastener 102) in a forward-thread direction while the axial motor 132 applies pressure towards the threaded pin 104, as illustrated in FIG. 3D. As the fastener 102 rotates, the fastener 102 is threaded onto the threaded pin 104.

At block 714, the motor controller 402 determines whether a predetermined torque has been reached. In some examples, the rotational motor 130 operates to apply a predetermined torque to the fastener 102. Once the predetermined torque is reached (e.g., as determined by torque detector 404), the motor controller 402 stops (e.g., deactivates) the rotational motor 130 at block 716. In other examples, the fastener 102 may be a frangible collar type fastener. In such an example, the nut 120 breaks away or separates from the collar 118 when a predetermined torque is reached. When the nut 120 breaks away from the collar 118, a decrease in torque applied by the rotational motor 130 is sensed by the torque detector 404, which is indicative that the nut 120 has detached from the collar 118 and the predetermined torque has been reached. Additionally or alternatively, the motor controller 402 may control the rotational motor 130 to rotate the driveshaft 126 a predetermined number of times (e.g., 5 turns) or operate for a period of time (e.g., 2 seconds).

If the predetermined torque has not been reached, the rotational motor 130 continues to rotate the driveshaft 126 in the forward-thread direction (at block 712) until the predetermined torque is reached. Once the predetermined torque is reached, the motor controller 402 stops the rotational motor 130 at block 716 and the example method 700 ends at block 718. In some examples, blocks 704-716 may be performed once the activation button 152 is pressed.

Figure 8:
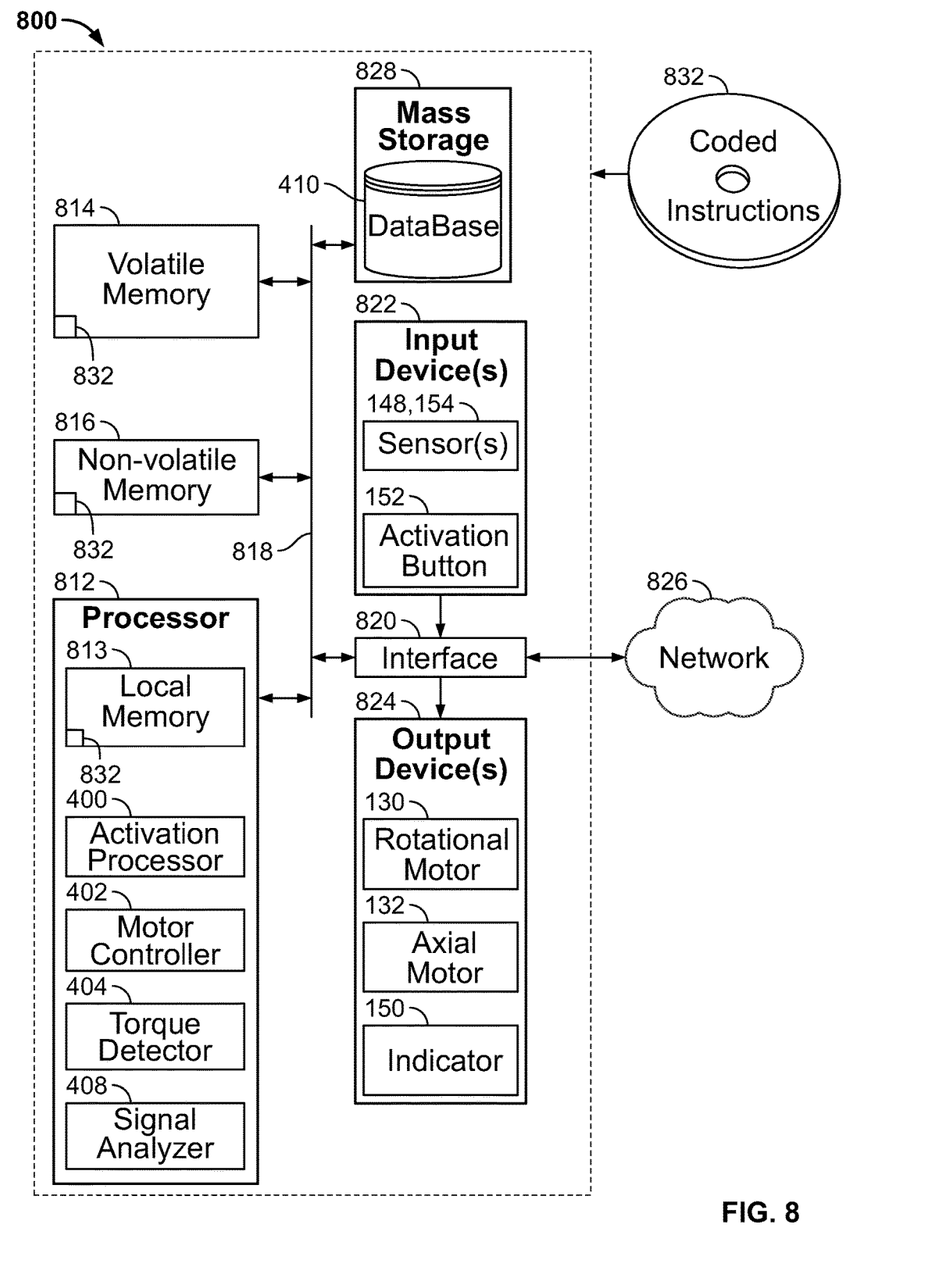
FIG. 8 is a processor platform that may execute instructions to implement the method of FIG. 7 and the example electronic control unit of FIG. 4.

FIG. 8 is a block diagram of an example processor platform 800 capable of executing instructions to implement the method of FIG. 7 and the electronic control unit 136 of FIG. 4 and/or the electronic control unit 602 of FIG. 6. The processor platform 800 can be, for example, a server, a personal computer, a mobile device (e.g., a cell phone, a smart phone, a tablet such as an iPad™), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. According to this example, the processor 812 may implement the example activation processor 400, the example motor controller 402, the example torque detector 404 and/or the example signal analyzer 408.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system. According to this example, the input device(s) 822 may include one or both of the example sensor(s) 148, 154 and/or the activation button 152.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor. According to this example, the output device(s) 824 may include the rotational motor 130, the axial motor 132 and/or the indicator 150.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage device(s) 828 for storing software and/or data. Examples of such mass storage device (s) 828 include floppy disk drives, hard drive disks, compact disk drives, Blu-ray disk drives, RAID systems, and digital versatile disk (DVD) drives. According to this example, the mass storage device(s) 828 may implement the example database 410.

Coded instructions 832 to implement the method 700 of FIG. 7 may be stored in the mass storage device 828, in the volatile memory 814, in the non-volatile memory 816, and/or on a removable tangible computer readable storage medium such as a CD or DVD.

From the foregoing, it will appreciated that the above disclosed methods, apparatus, and articles of manufacture may be used to determine whether a first threaded part is aligned with a second threaded part before screwing the parts together. Examples disclosed herein leverage the acoustic signal generated when two threaded parts come into alignment while rotating one or both of the parts in the reverse-thread direction. In other words, examples disclosed herein utilize active feedback from an acoustic transducer to determine when the two threaded parts are aligned. The examples disclosed herein greatly reduce and/or eliminate the risk of cross-threading the two parts and, thus, enable proper threading of two parts. Further, examples disclosed herein also improve the speed of fastener installation.

While the examples illustrated herein move the female part (e.g., a nut) toward the male part (e.g., a bolt), the examples disclosed herein may likewise operate by moving the male part toward to the female part. For example, instead of holding the fastener, the example thread alignment tool can hold the threaded pin, and can press the threaded pin against the fastener (which may be held stationary).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a cup defining a cavity;
a socket to hold a fastener, the socket disposed within the cavity, the socket moveable within the cavity relative to the cup; a sensor coupled to the cup and disposed adjacent the socket, the sensor to measure acoustic waves near the socket while the socket rotates the fastener in a reverse-thread direction against an end of a threaded pin; and
an electronic control unit configured to determine whether the fastener and the threaded pin are aligned based on the acoustic waves measured by the sensor.

2. The apparatus of claim 1, wherein the electronic control unit is configured to determine the fastener and the threaded pin are aligned when a thread-fall acoustic event is detected.

3. The apparatus of claim 2, further including a driveshaft, the socket coupled to an end of the driveshaft, the driveshaft extending through an opening in the cup such that the socket is disposed in the cavity and surrounded by the cup.

4. The apparatus of claim 3, further including a motor to rotate the driveshaft, wherein the electronic control unit is configured to activate the motor to rotate the driveshaft and the socket in the reverse-thread direction until the thread-fall acoustic event is detected.

5. The apparatus of claim 4, wherein the electronic control unit is configured to activate the motor to rotate the driveshaft and the socket in a forward-thread direction to tighten the fastener onto the threaded pin after the thread-fall acoustic event is detected.

6. The apparatus of claim 4, wherein the motor is a first motor, further including a second motor to move the driveshaft in an axial direction, the electronic control unit configured to activate the second motor to move the driveshaft to press the fastener against the end of the threaded pin while the first motor rotates the driveshaft and the socket in the reverse-thread direction.

7. The apparatus of claim 1, further including a seal coupled to a rim of the cup.

8. The apparatus of claim 1, wherein the sensor is a first sensor, further including a second sensor to measure the acoustic waves near the socket, and wherein the electronic control unit is configured to identify and block undesired noise based on the acoustic waves detected by the first and second sensors.

9. The apparatus of claim 1, wherein the fastener is a frangible collar fastener having a collar and a nut, the nut to decouple from the collar when a predetermined torque is applied to the nut.

10. The apparatus of claim 1, wherein the socket is rotatable within the cavity and moveable in an axial direction in the cavity.

11. A method comprising:
rotating a fastener, held by a socket, against an end of a threaded pin in a reverse-thread direction, the socket disposed within a cavity defined by a cup, the socket moveable within the cavity relative to the cup; detecting, with a sensor, a thread-fall acoustic signal generated by the fastener and the threaded pin, the sensor disposed on the cup adjacent the socket;
determining, with an electronic control unit, the fastener and the threaded pin are aligned based on the thread-fall acoustic signal detected by the sensor; and
stopping the rotation in the reverse-thread direction when the thread-fall acoustic signal is detected.

12. The method of claim 11, further including rotating, after stopping the rotation in the reverse-thread direction, the fastener in a forward-thread direction.

13. The method of claim 12, wherein rotating the fastener in the reverse-thread direction includes activating a motor to rotate the socket in a first direction.

14. The method of claim 13, wherein rotating the fastener in the forward-thread direction includes activating the motor to rotate the socket in a second direction opposite the first direction.

15. The method of claim 12, further including rotating the fastener in the forward-thread direction until a predetermined torque is applied.

16. The method of claim 11, further including activating an indicator when the thread-fall acoustic signal is detected.

* * * * *